Figure 1:
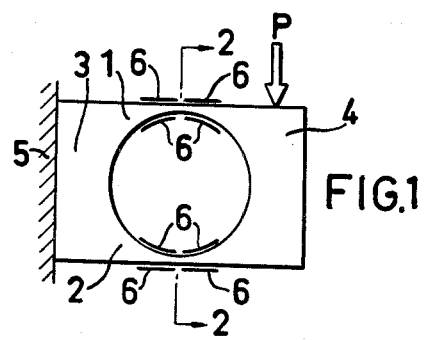

April 27, 1965  A. SÖDERHOLM  3,180,139

FORCE TRANSDUCERS

Filed Oct. 9, 1961

# United States Patent Office 3,180,139
Patented Apr. 27, 1965

3,180,139
FORCE TRANSDUCERS
Arne Söderholm, Furusangsvagen, Bromma, Sweden
Filed Oct. 9, 1961, Ser. No. 147,385
Claims priority, application Sweden, Oct. 12, 1960,
9,761/60
7 Claims. (Cl. 73—141)

The present invention relates to the type of force transducer which can be characterized as a spring balance, the resilience of which is measured by means of resistive strain gauges of wire, foil or semiconductor type. Such strain gauges are included in an electric circuit, which also contains an indicating member which gives an indication in response to the force acting upon the force transducer.

Various embodiments of such force transducers are already known. The resilient member must be shaped with regard to the magnitude of the force to be measured and must be such that it is highly independent of force components acting in directions other than the force to be measured (lateral forces).

When the forces to be measured are greater than 1 ton the resilient member generally consists of a cylinder which is acted upon in its longitudinal direction by the force to be measured, so that it is compressed or stretched. The relative length change—stretching or compression—is measured by means of the strain gauges and thus becomes a measure of the force. With regard to different embodiments of the cylinders reference may be made to the Swedish Patent 165,227, in which the most common types are described.

With forces less than about 1 ton the cross section area of the cylinder must be so small, in order to obtain sufficient strain, that this embodiment can not be used. Instead resilient elements are used, which are so shaped that certain parts thereof are exposed to bending moments caused by the force. In this case generally three embodiments may be used. The simplest one consists of a straight beam, one end of which is fixed in a base member, while the other end thereof is acted upon by the force to be measured, the bending moment in the beam increasing from the point of action of the force to be measured. The moment causes strains in the outermost fibers of the beam, which strains may be measured by means of the strain gauges. This embodiment is of limited use, because the force must act in an exactly defined direction and lateral forces must be eliminated in order that additional moments shall not influence the strain distribution in the longitudinal direction of the beam and thereby give a false measuring result. One possibility of avoiding this consists in causing the force to be measured to act via a flexible wire or rod which can be deformed by small bending moments. If the point of action of the force in the rod can be fixed or if, by means of mechanical guiding devices, it can be made to vary only slightly, the magnitude of the additional moments transferred to the beam may be reduced to a negligible value. However, this device requires external additional devices for the purpose of reducing the influence of lateral forces, which devices are bulky and uneconomical.

Another embodiment consists of a ring or ring-like body, which is acted on by the force in two diametral points of the circumference, along which latter the strain gauges are fixed. The strain of the said gauges also in this case is caused by the bending moments of different directions and magnitudes, produced around the circumference when the ring is acted upon by the force. With exact symmetry of the ring it may be shown that the influence of lateral forces is eliminated, which however, is not the case with unsymmetrical rings and which therefore is never possible in practice. Instead their influence is reduced by means of external guiding devices, for instance consisting of a rod, which is held at each end by means of membranes and which at one end is acted upon by the force in the longitudinal direction and with its other end is in contact with one side of the ring. The membranes are in this case fixed around their circumference to the base member against which the other side of the ring is resting.

A third embodiment, to the category of which the present invention belongs, consists of a parallelogram having two opposite sides of such dimensions that they are relatively stiff, the two other opposite sides being weak and band-shaped and therefore resilient. One example of this embodiment is also described in the German Patent 1,052,-708. If one of the stiff sides is fixed to a base member and the other one is acted upon by the force in a direction parallel to the opposite rigid side, the other two weak, resilient sides will be exposed to bending moments, causing strains in their outer fibers, which strains thus are a measure of the force. The bending moments vary, however, in their magnitude along the length of the resilient sides, and only certain parts thereof obtain measurable strains, if the construction is not over-loaded. If the device is acted upon by a lateral force component, this component, if acting in the plane at right angles to the plane of the parallelogram, causes a moment about an axis parallel with this plane and the weak sides, and the influence thereof may be reduced by giving the sections of the weak sides a greater width than thickness. On the contrary, if the lateral force component acts along the plane of the parallelogram, it causes tensile or compression strains in the weak sides, thereby causing in these sides slight additional strains in comparison with the strains caused by the bending moment of the force to be measured. Thus this embodiment will be able to take up lateral forces of considerable magnitude in comparison with the force to be measured.

The moments caused by the force to be measured vary, however, in magnitude and direction along the length of the spring-like weak sides in such a manner, that they are zero in the middle of the weak sides (if these are presumed to be fixedly secured in the rigid sides) and increase proportionally to the distance from the middle thereof. If the weak sides are band shaped and have a mainly constant thickness and width the resulting strain in these sides will have a distribution proportional to the moments. If strain gauges are placed at the ends of the weak sides—where the strains will be greatest these gauges—will have a strain varying along their length and having its maximum value at the ends adjoining the rigid sides. However, the resistance variation is proportional to the mean strain in the gauge along its acitve wire length, and the maximum strain acting upon the gauges is therefor considerably greater than the mean strain, if the length of the weak sides is not considerably greater than that of the strain gauges whereby the size of the measuring body, however, will be unpractically great and expensive in manufacture. Otherwise band shaped spring-like weak sides will cause a low ratio between total resistance variation and strain. Moreover these facts will result in a gauge that will have its greatest strain at one outer end where active resistance wire is missing which constitutes a disadvantage as the creeping will be unproportionally great. Creeping is hereby defined as resistance variations owing to lack in response between the strain of the gauges in relation to that of the base member whereby the time during which the gauge is acted upon by strain will increase. It may be shown that the creeping of gauges will occur mainly because of the fact that the outer end will be acted upon by shearing forces during force transmission between the base member and the gauge and that the ends will have a tendency to come loose from the base member. A gauge being stretched more at its outer end than at its middle will therefore creep more than a gauge having a constant strain along its length. In the case of a force transducer which shall transfer a force to an unambiguous resistance variation, resistance variations owing to creeping result in considerable disadvantages. These disadvantages have been eliminated according to the German Patent 1,052,708 by concentrating in one embodiment mechanical strains at the ends of the weak sides and the gauges have been placed there. Hereby the strains will occur substantially in the middle region of the gauges. The dimensions of the measuring body will, however, be considerable in this case in relation to the measuring length of the gauges.

As a rule the parallelogram-shaped body must be manufactured from a single piece of material in order to avoid friction between mutually attached parts, as friction otherwise would reduce changed moment distributions and thereby measuring faults. The manufacture of the parallelogram will by this reason be relatively expensive. This type of force transducer because of these reasons has had only a restricted application.

The object of the present invention is to obtain a force transducer intended for measuring of forces mainly lower than 1 ton with an optimum shape with regard to the requirements of the strain distribution in the base member of the strain gauges, which force transducer has little sensitivity to side forces and which will at the same time have a simple shape and thereby will be economical to manufacture.

The force transducer according to the invention consists of a modified parallelogram shape of the measuring body. The parallelepiped-shaped measuring body has two parallel, rigid parts, of which one is attached to a rigid base member and the other is acted upon by the force. The two rigid parts are united with two or more weak resilient parts which are so shaped that from their middle to the rigid parts their thickness will increase and upon which the strain gauges are attached. On account of the fact that the thickness of the last-mentioned parts increases from the middle thereof, the advantage is obtained that the mechanical strain corresponding to the moments of the force are caused to vary in such a manner that the strain gauges may be placed at locations on the weak resilient parts where maximum strain will be produced but the distribution of the strains is such that it will decrease to approximately zero at both ends of the gauge. A substantially perfect distribution of the strains will be produced if one contour of the weak part is plane and the other is a circular cylinder surface. Owing to the last-mentioned fact an extremely simple shape will be obtained, as the body may be shaped as a parallelepiped with a cylindrical circular hole. In order to fix the body in relation to its surroundings and at the same time obtain an incapsulation, the one rigid part is fixed at the inside of a tube having its axis of symmetry in the longitudinal direction of the two rigid parts. The force to be measured will be brought to act upon the other rigid part by the means of a pin fixed thereto. In order to make the incapsulation complete said tube has at its ends membranes which are also attached at the free rigid part by means of the pin which transfers the force to be measured and are moreover attached to the opposite side of the said rigid part. By means of the said last-mentioned arrangement compensation is obtained for the variations of the air pressure between the inner and outer sides of the gauge which is extremely important as these pressure variations otherwise would give rise to additional measured forces which will manifest themselves as measuring faults.

Figure 2:
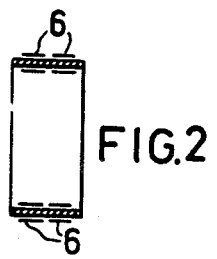
Figure 3:
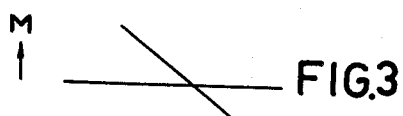
Figure 4:
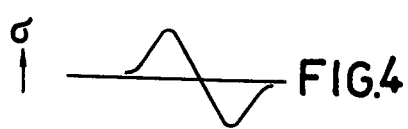
Figure 5:
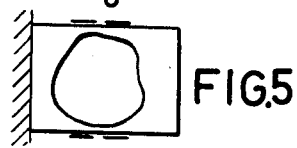
Figure 6:
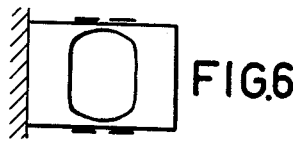
Figure 7:
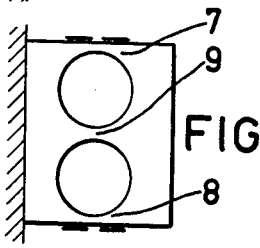

On the drawing embodiments of the force transducer according to the invention are shown by way of examples. FIGS. 1 and 2 illustrate a principal embodiment of the measuring body and FIGS. 3 and 4 illustrate the distribution of the moments and mechanical strains in the resilient weak parts. FIGS. 5, 6 and 7 represent three other principal embodiments of the measuring body. The construction of a complete force transducer is represented in FIG. 8.

According to FIG. 1, the force transducer consists of a parallelepiped-shaped body which includes two resilent weaks parts 1 and 2, whereby the one contour line of these parts is plane and the other is a circular cylinder surface. The weak parts are integral with two rigid parts 3 and 4, of which one, 3, is attached to a base member 5, which is fixed to the surroundings. The force to be measured, P, acts upon the part 4 in a direction parallel with the longitudinal axis of the two rigid parts 3 and 4. On account of the action of the force to be measured mechanical strains will be produced in the resilient weak parts 1 and 2, which strains are measured by means of the strain gauges 6. FIG. 2 shows a section through the body according to FIG. 1 and along the line 2—2, which is the middle of the weak parts, whereby it appears that two gauges 6 are arranged side by side. FIG. 3 shows the moments M produced by the force P to be measured in the weak parts 1 and 2. These moments are zero at the section 2—2 in FIG. 1 and increase proportionally to the distance from the section line and have different directions on the respective sides of the line. The moment M gives rise to mechanical strains, $\sigma$, in the weak parts, the variation of which along the upper plane surface appears from FIG. 4. $\sigma$ is zero, where M is zero and increases together with the magnitude of the moments and the moment of resistance of parts 1 and 2. The last-mentioned moment varies with the thickness and width of the parts and as the thickness varies the strain is different in each section of the parts 1 and 2. Above the middle of these parts the thickness is relatively constant, for which reason $\sigma$ increases mainly proportionally to the increase of M with the distance from the middle. However, as the distance becomes greater the thickness increases, and therefore the increase of $\sigma$ will be less and at a place, where the increase of the thickness preponderates, the increase of the moment will instead decrease and decreases to a low value, which corresponds to the moment of resistance of the rigid parts. The gauges 6 are arranged on those parts which have the greatest mechanical strain and thereby stretching and have such size that their ends will be actuated by insignificant strain. Owing to the fact that M changes direction on the middle part of 1 and 2 the corresponding strain $\sigma$ also changes its direction, whereby e.g. the upper side of the left part of 1 is actuated by tensile stress in the outer fiber and the right part by compression in the corresponding fibers. On the other surfaces of parts 1 and 2 the same strain variations are obtained but with different directions. On the upper surface of part 2 the same directions as shown in FIG. 4 are thus obtained, whereas at the lower side of 1 and the lower side of 2 the opposite directions are obtained. Under these circumstances it appears that the strain as well as the compression is obtained at the same time in a weak part, whereby gauges with different signs of resistance variations may be placed near each other. This fact is valuable from the temperature compensating point of view, as the resistance changes in the gauges owing to differences in temperature will give rise to measuring faults at the base member at varying temperatures. When the gauges are arranged near each other on the same base member the conditions for temperature differences are at a minimum. FIGS. 5 and 6 show some other embodiments of the measuring body. In these cases the hole, which determines the variations of thickness of the weak parts, has along its longitudinal direction a geometry other than a circle. By having the thickness increasing more or less from the middle of the parts the variation of the mechanical strain will be influenced along the length of the weak parts. Such embodiments which appear from the last-mentioned figures, make it possible for one to obtain, for certain types of gauges or combinations of forces to be measured as well as side forces, particularly suitable strain variations along the surface of the gauge. But such embodiments will as a rule be more expensive in manufacture than the circular hole, shown in FIG. 1.

FIG. 7 shows a measuring body having three weak parts 7, 8, and 9, which embodiment is obtained by mainly two cylindrical holes adjacent each other but having between themselves such a great distance that a weak part 9 is obtained. The axes of both cylindrical holes are located in a common plane parallel with the direction in which the force P is applied. Hereby the rigidity of the body is increased so that a greater load to be measured may be taken up than in the case of a body having approximately the same dimensions but having two weak parts only, if the same magnitude of the strain and the same distribution of the strain is presupposed. If such a body is actuated by side forces these will in-influence weak part 9 in a lesser degree than weak parts 7 and 8. For these reasons strain gauges should first of all be placed on part 9, but may alternatively be placed on the planar surface of parts 7 and 8, as shown in FIG. 7.

Figure 8:
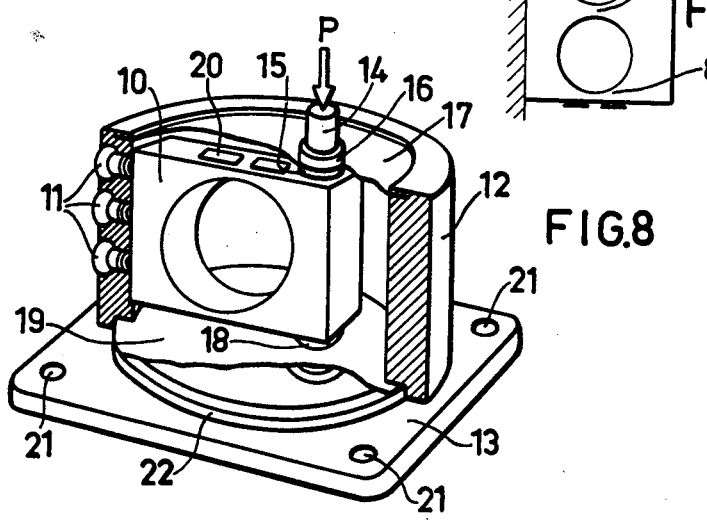

FIG. 8 illustrates the force transducer contained within a casing, which is partly broken away in order to show its construction. The measuring body 10 is shaped with a circular cylindrical hole as in FIG. 1. The one rigid part of the body is by means of three screws 11 clamped to the casing 12, which is partly broken away on the figure and had the form of a thick-wall short tube, which is attached to the base plate 13 by means of screws which are not shown in the figure, or by means of welding or hard soldering. The force P to be measured is transferred to the measuring body 10 by means of a pin 14, which is rigidly secured to the body 10 by being screwed into the material adjacent the step 15 on the pin and is moreover locked by a locking pin not shown in the figure, and inserted through 10 and 14. Between the step 15 and the washer or the nut 16 a membrane 17 is clamped which consists of metal or plastic and is so resilient that at the deformations it undergoes when the measuring body 10 is deformed by P, it takes up an insignificant amount of the applied force. The washer or nut 16 is welded, soldered or screwed upon the pin 14. The membrane 17 is attached along its circumference to the casing 12 by means of welding or gluing. On the opposite side of the measuring body 10 in relation to the pin 14 a shorter pin 18 is screwed, which is attached to a membrane 19 having the same dimension and being of the same material as membrane 17 and moreover attached along its periphery to the casing 12. A part of the membrane 19 is omitted in the figure. In the figure strain gauges 20 are shown attached to the upper side of the measuring body 10 at the points where the weak parts receive the greatest strain.

Together with two further gauges which are placed on the lower side of the body 10 and are therefore not visible in the figure, the gauges 20 are electrically connected to a bridge coupling to which connection leads are lead over the casing by means of a tight bushing. The base plate 13 which is of rectangular form has four attachment holes 21 and is provided with an annular shoulder 22, which serves as a guide for the casing 12 and also for clamping the membrane 19 firmly against the casing 12 so that a certain distance is obtained between the membrane 19 and the plate 13. The interior of the force transducer may be entirely enclosed by means of the membranes 17 and 19 against the surrounding air, whereby the air volume within the interior as a result of the sealing will be constantly enclosed. If the temperature of the force transducer is altered this brings about an altered pressure in the enclosed air volume as compared with the air pressure of the surroundings. This pressure difference will give rise to forces on the membranes 17 and 19 which forces are transferred to the measuring body 10. If however the membranes 17 and 19 are equally large the forces produced will balance each other whereby no resultant force having the same direction as the measuring force P will appear. The same result is obtained if the temperature is constant but the outer air pressure is instead varied. The force transducer is thus sensitive to such variations in temperature and pressure of the surroundings, in spite of its complete incapsulation.

What I claim is:

1. A force transducer comprising a measuring body having a parallelepipedic shape, said body including first and second spaced apart rigid portions terminating respectively in first and second opposite faces of the parallelepiped, and at least two other spaced apart resilient portions interconnecting said rigid portions and terminating in third and fourth opposite faces of the parallelepiped which are perpendicular to said first and second faces, means securing said parallelepiped body to a fixed support by attaching said first face and the corresponding first rigid portion to said support, the force to be measured being applied to said second rigid portion at said third face along a direction parallel with said first and second faces, said resilient portions of the parallelepiped body having planes of minimum thickness respectively located in a common plane parallel with the direction of the applied force and said resilient portions increasing in thickness in both directions away from said minimum thickness planes towards said first and second rigid portions, and strain gauges attached to at least one face of each said resilient portion at each side of its plane of minimum thickness.

2. A force transducer as defined in claim 1 wherein each said resilient portion is established between one plane face of the parallelepiped body and a circular cylindrical surface.

3. A force transducer as defined in claim 1 wherein each said resilient portion is established between one face of the parallelepiped body and opposite portions of one and the same circular cylindrical surface formed by a cylindrical bore through the body having its axis parallel with said third and fourth faces.

4. A force transducer as defined in claim 1 and wherein said parallelepiped body includes at least three spaced apart resilient portions interconnecting said rigid portions, two of said resilient portions terminating in said third and fourth opposite faces of the parallelepiped and the third resilient portion being located intermediate the other two resilient portions, all of said resilient portions including planes of minimum thickness respectively located in a common plane parallel with the direction of the applied force and increasing in thickness in both directions away from said minimum thickness planes towards said first and second rigid portions.

5. A force transducer as defined in claim 4 wherein said three spaced apart resilient portions are established by two circular cylindrical bores through the parallelepiped body, the respective axes of said bores being located in said common plane.

6. A force transducer as defined in claim 1 wherein said support for the parallelepiped body is constituted by the inner wall of a cylindrical casing which surrounds the body, the longitudinal axis of said casing being parallel with the direction of the force applied to the parallelepiped body.

7. A force transducer as defined in claim 6 and which further includes first and second flexible membranes closing the opposite ends respectively of said cylindrical casing, the force to be measured being applied by way of a pin secured to said second rigid portion of the parallelepiped body, said pin extending through said first flexible membrane and being secured thereto in such manner as to space said first membrane from the parallelepiped body, and means also securing said second membrane to but spaced from said second rigid portion of the parallelepiped body.

References Cited by the Examiner

UNITED STATES PATENTS

| | | | |
|---|---|---|---|
| 2,561,318 | 7/51 | Ruge | 73—141 X |
| 2,597,751 | 5/52 | Ruge | 73—141 X |
| 2,866,059 | 12/58 | Laimins | 73—141 X |
| 2,920,487 | 1/60 | Green | 73—398 X |
| 3,004,231 | 10/61 | Laimins. | |

RICHARD C. QUEISSER, *Primary Examiner.*

DAVID SCHONBERG, *Examiner.*